(12) United States Patent
Loehr

(10) Patent No.: US 6,182,427 B1
(45) Date of Patent: Feb. 6, 2001

(54) DRIVESHAFT/BEARING GEARBOX STEERING ARRANGEMENT

(75) Inventor: Thomas J. Loehr, Mt. Calvary, WI (US)

(73) Assignee: Gehl Company, West Bend, WI (US)

(*) Notice: Under 35 U.S.C. 154(b), the term of this patent shall be extended for 0 days.

(21) Appl. No.: 09/329,167

(22) Filed: Jun. 9, 1999

Related U.S. Application Data

(63) Continuation-in-part of application No. 08/795,001, filed on Feb. 5, 1997, now Pat. No. 5,964,076.

(51) Int. Cl.[7] .................................................... A01D 75/30
(52) U.S. Cl. .................................. 56/6; 56/15.5; 56/14.9; 56/228
(58) Field of Search .............................. 56/6, 15.1, 15.5, 56/15.3, 14.9, 15.4, 14.7, DIG. 14, 218

(56) References Cited

U.S. PATENT DOCUMENTS

| | | | |
|---|---|---|---|
| 4,160,356 | * | 7/1979 | Mathews . |
| 4,858,418 | * | 8/1989 | von Allwoerden . |
| 4,896,484 | * | 1/1990 | Jennings . |
| 4,899,523 | * | 2/1990 | Frumholtz et al. . |
| 5,094,063 | * | 3/1992 | Wattron et al. . |
| 5,272,859 | * | 12/1993 | Pruitt et al. . |

* cited by examiner

Primary Examiner—H. Shackelford
(74) Attorney, Agent, or Firm—Andrus, Sceales, Starke & Sawall, LLP

(57) ABSTRACT

A pull-type harvesting machine is adapted for laterally offset attachment to a tractor. The machine has a frame and a harvesting head supported by the frame including a cutting apparatus for cutting crops as the machine is towed across a field, and a gear box operably connected with the cutting apparatus. A pull tongue is pivotally coupled to the frame about a first vertical axis for varying the position of the machine relative to the tractor. A mechanical drive line extends along and is rotatably supported by the pull tongue for supplying driving power to the cutting apparatus through the gear box. The gear box is pivotally mounted on the header about a second vertical axis spaced from the first vertical axis. The drive line includes a fixed position portion and a telescoping portion supported at fore and aft ends by the tongue and the gear box, respectively. A shielding arrangement surrounds the telescoping portion of the drive line and is connected to the gear box for steering the gear box in response to movement of the pull tongue by pivoting the gear box about the second vertical axis. Alternatively, a bearing arrangement may be interconnected with the gear box for steering the gear box in response to movement of the pull tongue by pivoting the gear box about the second vertical axis.

18 Claims, 8 Drawing Sheets

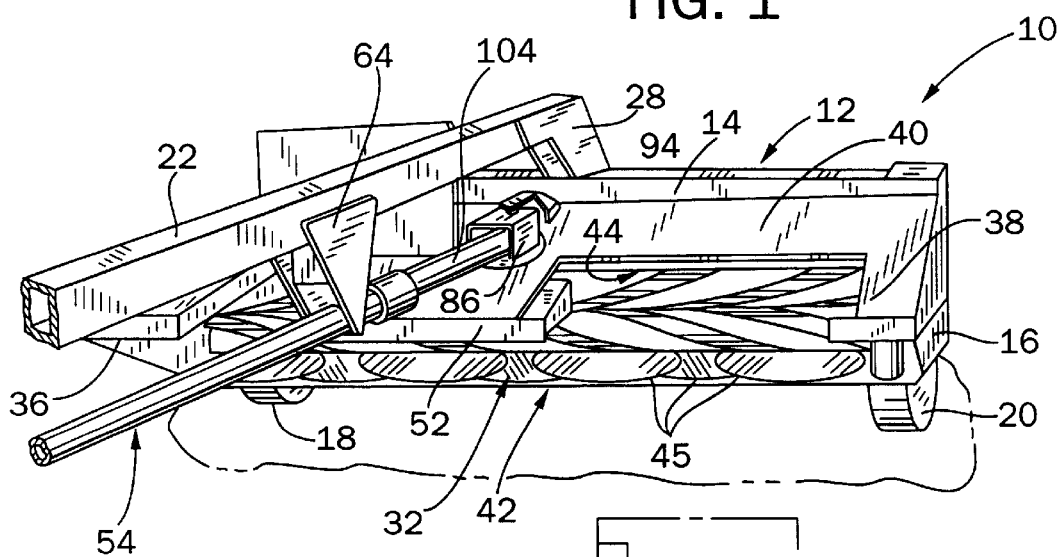
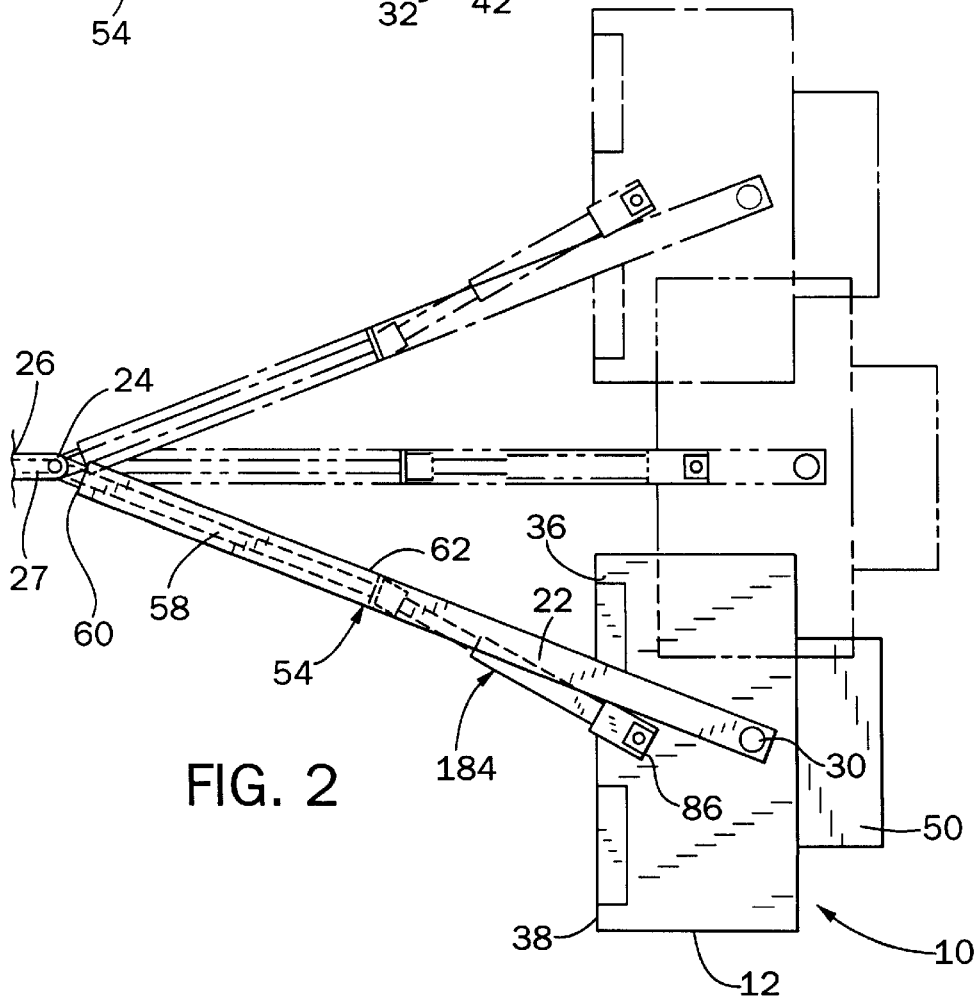

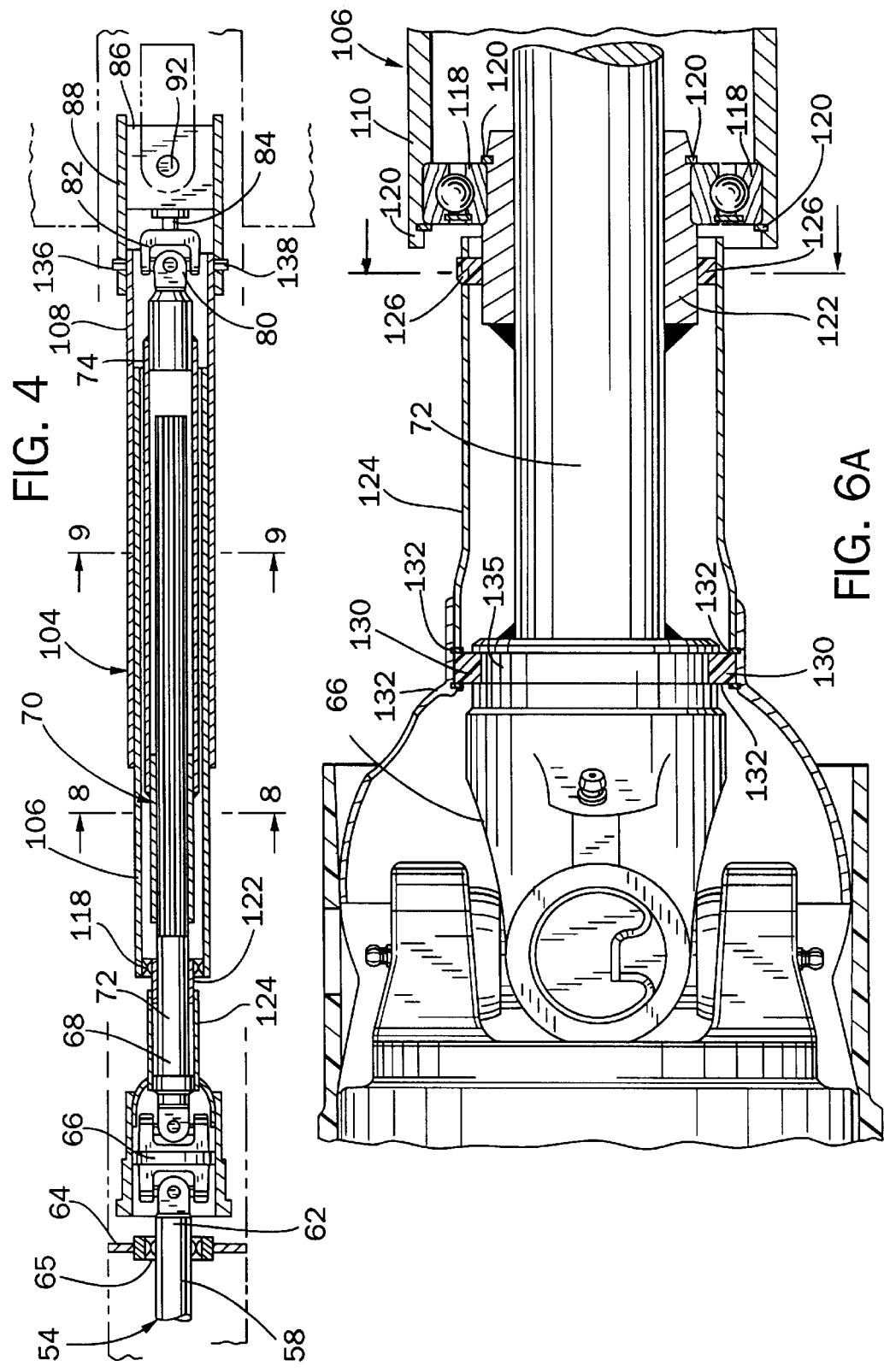

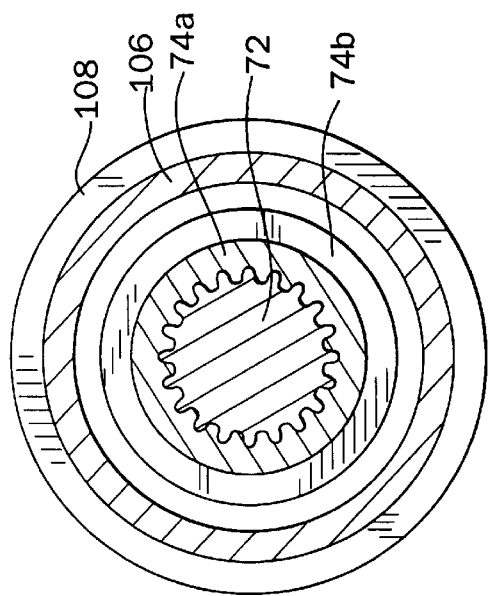
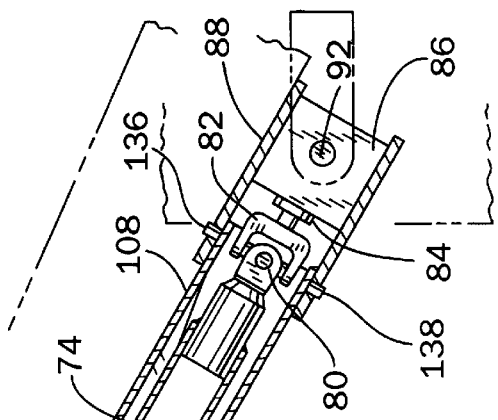
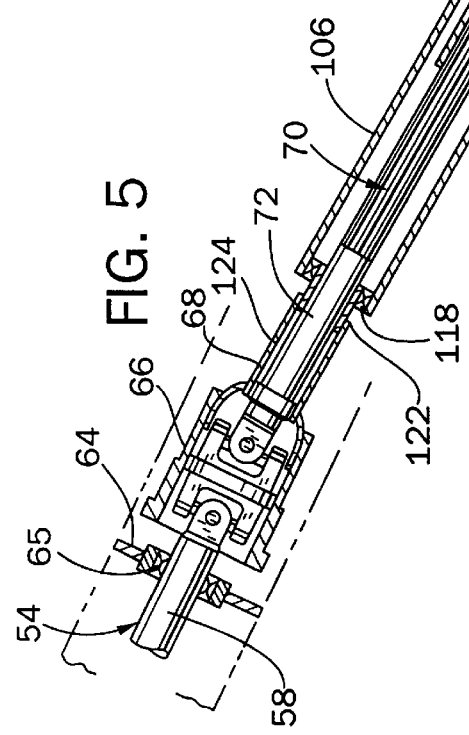
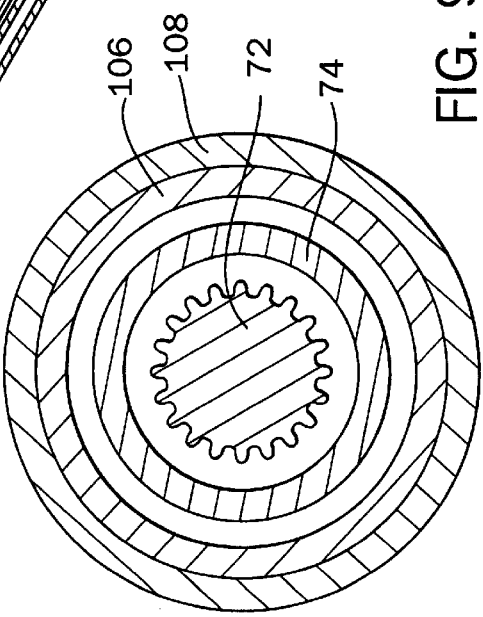
FIG. 8
FIG. 5
FIG. 9

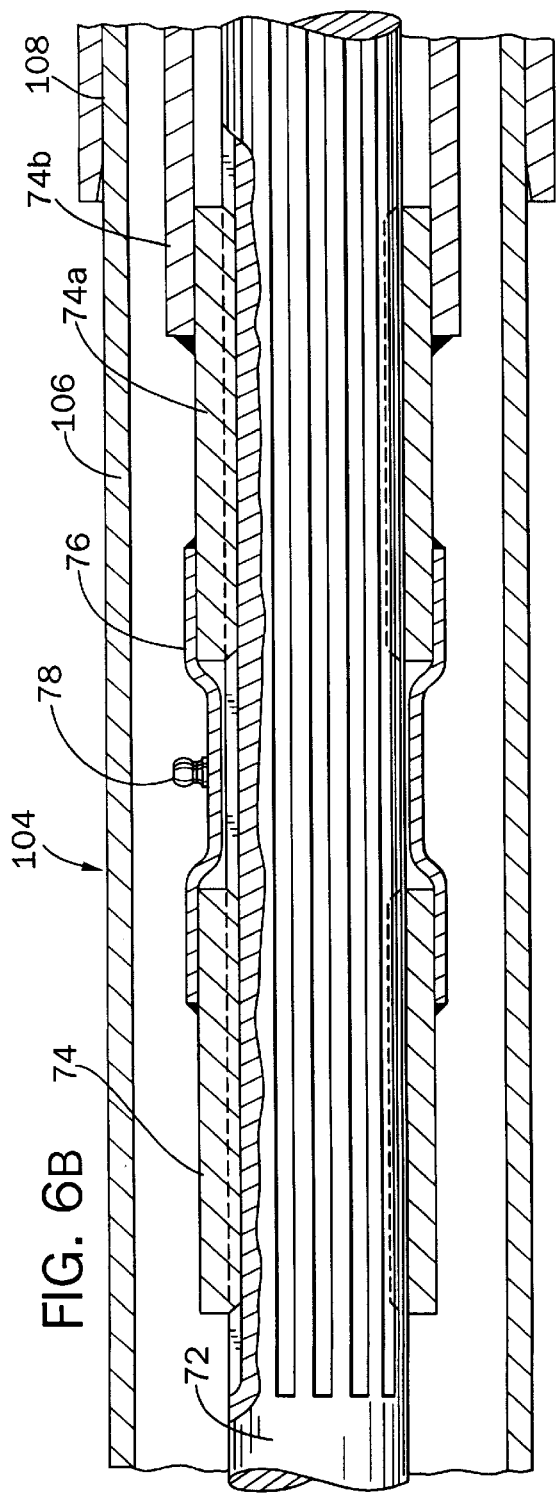
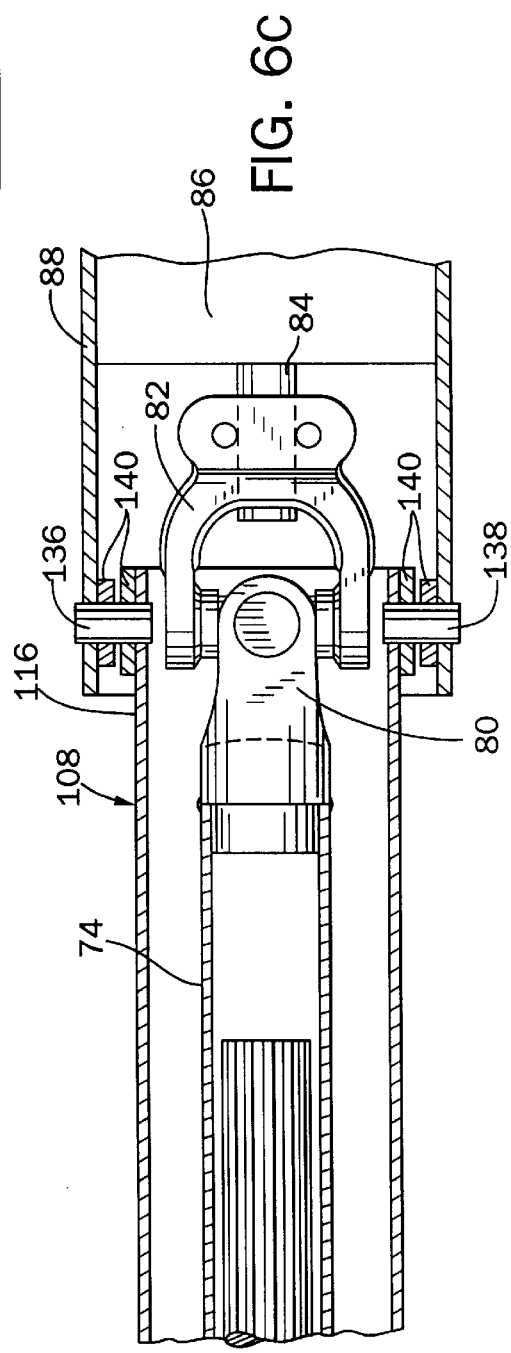

DRIVESHAFT/BEARING GEARBOX STEERING ARRANGEMENT

CROSS-REFERENCE TO RELATED APPLICATIONS

This application is a continuation-in-part of application Ser. No. 08/795,001, filed Feb. 5, 1997 now U.S. Pat. No. 5,964,076.

STATEMENT REGARDING FEDERALLY SPONSORED RESEARCH OR DEVELOPMENT

Not applicable.

FIELD OF THE INVENTION

The present invention relates broadly to a swing tongue crop harvester which operates in laterally offset positions relative to a towing tractor being advanced across a crop field and, more particularly, pertains to a mower conditioner having a driving arrangement for driving the cutting and conditioning components of the mower conditioner by means of a mechanical connection linking a power take-off shaft of the tractor with a gear box on the mower conditioner.

BACKGROUND OF THE INVENTION

Swing tongue, pull-type crop harvesters have gained widespread acceptance with farming personnel due to their capability to be controlled by the tractor operator to effectively steer or navigate through a variety of turns and maneuvers in a field with standing crops. With respect to center pivot swing tongue harvesters wherein the draw bar or tongue is pivotably connected adjacent the transverse center of the harvester, the machine has the ability to cut and/or condition crops as it is towed back and forth by the tractor across a field with the harvester swinging from one side of the tractor to the other during alternate runs. Harvesters of this type typically include a wheeled frame to which the tongue is connected, and a harvesting head pivotably mounted to the frame for movement about a horizontal axis between raised and lowered positions.

Swinging the crop harvester laterally from side-to-side behind the tractor, however, causes difficulties in the transmission of driving power from a power take-off shaft on the tractor to the cutting and conditioning components of the machine. One crop harvester of this type is disclosed in U.S. Pat. No. 4,858,418 issued Aug. 22, 1989. This patent discloses a mowing machine having an undercarriage frame and a crossbeam to which a plurality of cutting tools are mounted for rotation about vertical axes. Cutter blades are connected to the lower ends of the cutting tools. The cutting machine is connected to the tractor by means of a pivotable tractor hitch and the cutting tools are driven by a drive line interconnecting a power take-off shaft of the towing tractor and a gear box on the crossbeam. The drive line includes a fixed position shaft segment and a universally jointed telescopic drive shaft assembly. The gear box is pivotally connected on a middle part of the crossbeam and the drive line is connected with the gear box by means of a support joint having forked parts pivotally interconnected on a horizontal axis. In this arrangement, the forces necessary to steer or pivot the gear box are transmitted through the drive line to the forked support joint between the gear box and the drive line.

Another example of a swing-type crop harvester is disclosed in U.S. Pat. No. 5,272,859 issued Dec. 28, 1993. In this patent, a drive line from the power take-off shaft of the tractor extends along the tongue and is supported in underslung relationship so that the rear end of the drive line is coupled with the input shaft of the gear box which extends fore and aft. A conventional drive line shield surrounds the drive line to prevent entry of contaminants into the telescoping sections and to prevent accidental contact with the drive line. When the tongue is swung back and forth to reposition the harvesting portion of the machine, a telescoping section of the drive line between a supporting point on the tongue and the connection with the gear box telescopically extends and retracts to accommodate the different axes of rotation of the tongue and of the gear box. A telescoping steering linkage is connected between the tongue and the gear box to steer or pivot the gear box as the tongue is swung. This arrangement relieves steering forces on the drive line but adds to the time and cost of assembly due to the separate gear box steering mechanism.

Attempts have been made by the prior art to address the problems in transmitting power from the tractor to the cutting and conditioning components of the harvester by employing different structures to provide input power from the drive line to the gear box and to pivot or steer the gear box. It is an object of the present invention to provide a mechanical drive line connection and gear box steering structure which is capable of satisfying the power requirements of the harvester while minimizing the torsional loading on the telescopic drive line connection at its connection to the gear box. It is a further object of the invention to provide a power input and gear box steering structure which is simple in its design and construction.

BRIEF SUMMARY OF THE INVENTION

The present invention advantageously provides a tractor drawn, swing tongue crop harvester in which the cutting and conditioning components are driven by a unique mechanical drive line arrangement which operates to effectively steer the gear box for the harvester in the general direction of the tongue in a manner which will accommodate turning and other angular motion of the harvester, including movement of the head between its raised and lowered positions.

In one aspect of the invention, a pull-type harvesting machine adapted for laterally offset attachment to a tractor includes a frame, a harvesting head supported by the frame and including a cutting apparatus for cutting crops as the machine is towed across a field, and a gear box operably connected with the cutting apparatus. A pull tongue is pivotably coupled to the frame about a first vertical axis for varying the position of the machine relative to the tractor. A mechanical drive line extends along and is rotatably supported by the pull tongue for supplying driving power to the cutting apparatus through the gear box. The gear box is pivotally connected on the header about a second vertical axis spaced from the first vertical axis and the drive line includes a fixed position portion and a telescopic portion supported at fore and aft ends by the tongue and the gear box, respectively. A shielding arrangement surrounds the telescopic portion of the drive line and is interconnected with the gear box for steering the gear box in the general direction of the pull tongue. A bearing arrangement is disposed between the telescopic portion of the drive line and the shielding arrangement. The shielding arrangement has one end supported on the drive line and another end pivotally connected to the gear box. The shielding arrangement includes a first shield and a second shield telescopically mounted relative to the first shield. An end of one of the shields is supported by a bearing on the drive line, and an end of the other shield is pivotally attached about a horizontal axis to the gear box.

In the preferred embodiment, the shielding arrangement has an inner shield having a forward end and a rearward end, and an outer shield having a forward end and a rearward end, the outer shield being telescopically mounted on the inner shield. The drive line includes a surrounding hub, and a bearing is disposed between the forward end of the inner shield and the hub to allow rotation of the drive line relative to the inner shield. A CV joint connects a fixed position portion of the drive line with the telescopic portion of the drive line, and includes a jacket extending forwardly from the forward end of the inner shield. A first nylon bearing is disposed between an enlarged portion of the CV joint and the CV jacket, and a second nylon bearing is disposed between the hub and the jacket to allow rotation of the drive line relative to the jacket. The rearward end of the outer shield is pivotally attached to the gear box.

In a second embodiment of the invention, the shielding arrangement has an outer shield having a forward end and a rearward end and an inner shield having a forward end and a rearward end, the inner shield being slidably and telescopically mounted within the outer shield. The drive line includes a surrounding hub and a bearing is disposed between the forward end of the inner shield and the hub to allow rotation of the drive line relative to the inner shield. The rearward end of the inner shield is pivotally attached to the gear box. The forward end of the outer shield is mounted to allow rotation of the drive line relative to the outer shield. A CV joint connects a fixed position portion of the drive line to the telescopic portion of the drive line and includes a collar provided with a rearwardly extending crown having an inner portion and an outer portion. The forward end of the outer shield surrounds the outer portion of the crown, and a bearing element is disposed between the inner portion of the crown and the enlarged portion of the CV joint to permit rotation of the drive shaft relative to the outer shield.

In a third embodiment of the invention, the forward end of the outer shield is provided with a pair of forwardly extending rods. Each of the rods is slidably mounted in a spherical bearing insert attached to a downwardly depending pedestal of the tongue to allow limited fore and aft movement of the outer shield relative to the drive line.

In another aspect of the invention, a pull-type harvesting machine is adapted for laterally offset attachment to a towing tractor having a power take-off shaft. The harvesting machine includes a wheeled frame and a harvesting header supported by the frame which includes a cutting apparatus for cutting crops as the machine is towed by the tractor across a field. A gear box is pivotably mounted about a first upright axis on the header for receiving driving power from the power-take-off shaft and transmitting the driving power to the cutting apparatus. A pull tongue is pivotally coupled to the frame for swinging movement in a horizontal plane about a second upright axis spaced from the first upright axis for varying the position of the machine relative to the tractor. A mechanical drive line extends along and is rotatably supported by the pull tongue for supplying driving power to the cutting apparatus through the gear box. The drive line includes a forward portion extending beneath the pull tongue and having a first end connected to the power take-off shaft and a second end connected to a pedestal portion of the tongue. A connecting joint joins the second end of the forward portion of the drive line with a telescopic portion having a first end connecting the first connecting joint and a second end connected to the gear box via a second connecting joint. A shielding arrangement surrounds the telescopic portion of the drive line and is interconnected with the gear box for steering the gear box in the general direction of the pull tongue. The shielding arrangement has one end nearest the tractor supported on the telescopic portion of the drive line, and a second end pivotally connected to the gear box about a horizontal pivot axis independent of the second connecting joint.

Various other objects, features and advantages of the invention will be made apparent from the following description taken together with the drawings.

BRIEF DESCRIPTION OF THE SEVERAL VIEWS OF THE DRAWING

The drawings illustrate the best mode presently contemplated of carrying out the invention.

In the drawings:

FIG. 1 is a fragmentary perspective view of a tractor-towed, swing tongue harvester provided with a shielded drive line and gear box steering arrangement constructed in accordance with the present invention;

FIG. 2 is a top plan view of the harvester of FIG. 1 showing, in solid lines, the harvester shifted to the left hand side position of a tractor draw bar and showing, in phantom lines, the harvester shifted to a center position directly behind the draw bar and a right hand side position of the draw bar;

FIG. 4 is partial sectional view taken on line 4—4 of FIG. 3 and showing the shielded drive line and gear box steering arrangement in a retracted condition to place the harvester in the center position shown in FIG. 2;

FIG. 5 is a sectional view similar to FIG. 4 but showing the shielded drive line and gear box steering arrangement in an extended condition to place the harvester in the left hand side position shown in FIG. 2;

FIG. 6a is an enlarged, fragmentary detail view, partially in cross-section, showing the forward end of the shielded drive line and gear box steering arrangement of FIGS. 3–5;

FIG. 6b is an enlarged, fragmentary detail view, partially in cross-section, showing an intermediate portion of the shielded drive line and gear box steering arrangement of FIGS. 3–5;

FIG. 6c is an enlarged, fragmentary detail view, partially in cross-section, showing the rearward end of the shielded drive line and gear box steering arrangement of FIGS. 3–5;

FIG. 7 is a sectional view taken on line 7—7 of FIG. 6a;

FIGS. 8 and 9 are sectional views taken on lines 8—8 and 9—9, respectively, of FIG. 4;

DETAILED DESCRIPTION OF THE INVENTION

Figure 3:
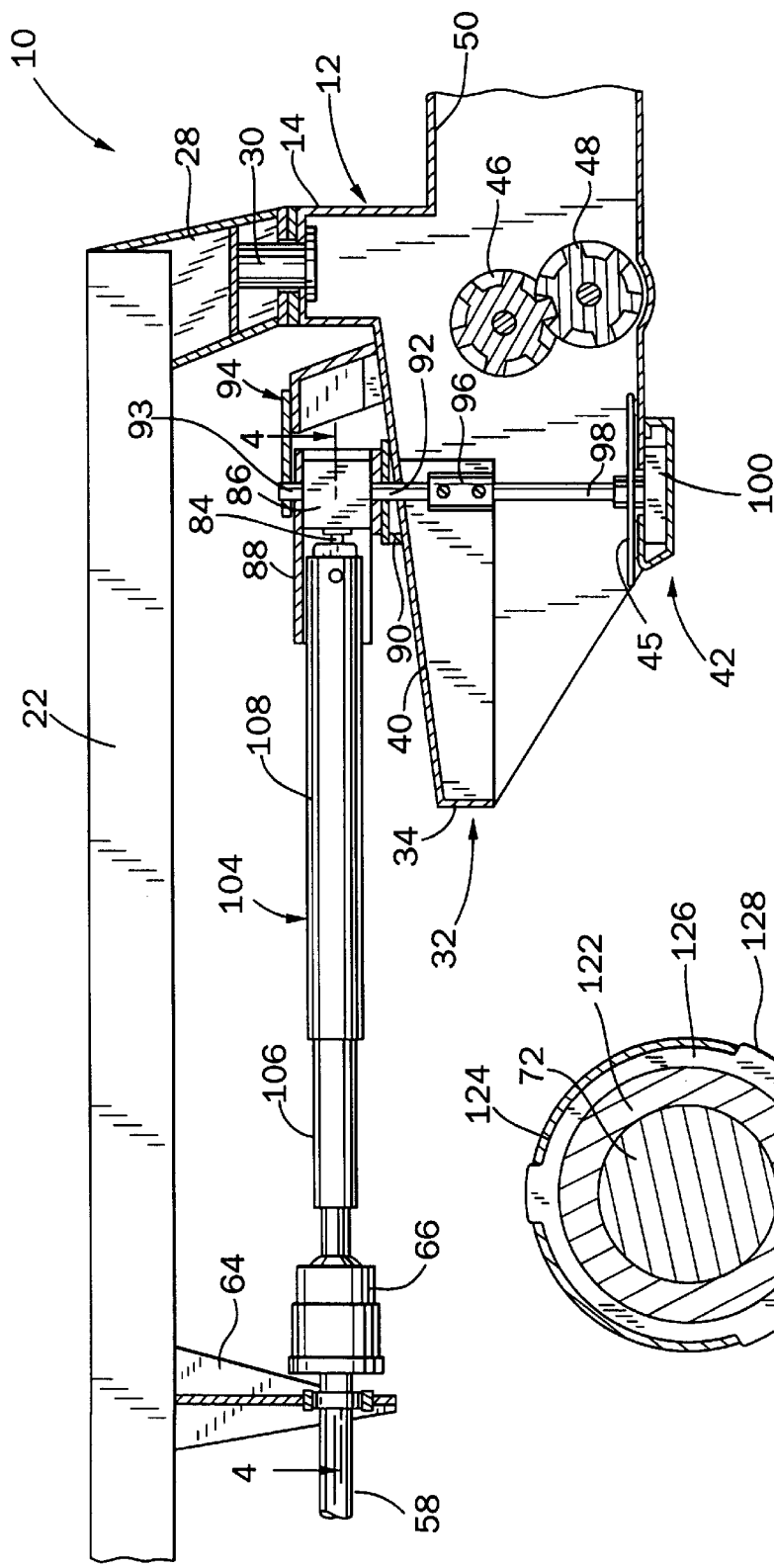
FIG. 3 is a fragmentary side view partially in section showing the drive line shield and gear box steering device of FIG. 1.

Referring now to FIGS. 1–3, a crop harvester 10 preferably takes the form of a conventional mower conditioner which is used to cut and condition a standing crop. The harvester 10 generally includes an inverted U-shaped frame 12 having an upper transverse cross member 14 and a pair of depending support legs 16 at opposite ends of the cross member 14, only one of the legs 16 being visible in FIG. 1. A pair of ground wheels 18, 20 are secured to the lower ends of the legs 16 for mobilizing the frame 12, such wheels 18, 20 being capable of use on a variety of grades and terrains. Frame 12 is adapted for towing movement through an elongated, beam-like, tongue or draw bar 22 having a hitch 24 at its forward end for connection to the hitch of a tractor shown at 26. As is well known, the tractor includes a power take-off shaft 27 for providing driving power to various types of framing equipment. At its rearward end, the tongue 22 has a downwardly depending neck portion 28 which is pivotably attached to the center of the cross member 14 by a cylindrical spindle 30 to define a first upright or vertical pivot axis.

The tongue 22 depicted in FIG. 1, as well as in the solid lines of FIG. 2, is in its left hand most position relative to the tractor, it being understood that the tongue 22 may be swung about its pivot axis to any number of angular positions including the centered and right hand most position shown in phantom lines in FIG. 2. Although not illustrated because it does not form part of the invention, the harvester 10 may be suitably provided with a power system such as a hydraulic cylinder which can be remotely operated from the tractor seat to selectively swing the tongue to the desired position. It should likewise be understood that the harvester 10 may include a suitable power system (not shown) for raising and lowering the frame 12 relative to the ground, and a suitable suspension system for cushioning the frame 12 over various terrains.

A harvesting header generally identified by the reference numeral 32 (FIG. 3) is supported by the frame 12 under the tongue 22. It can be appreciated that the header 32 may be configured in a number of different designs to perform the desired function. In the preferred embodiment, the header 32 is designed to both mow or sever the standing crop and then condition the cut crop prior to discharging it in a windrowed or swathed condition. It is understood, however, that the present invention is applicable to other harvesters which perform functions other than mowing and conditioning. In accordance with conventional construction, header 32 is pivotably mounted to frame 12 for movement about a horizontal pivot axis between raised and lowered positions.

As best seen in FIGS. 1 and 3, the header 32 has a substantially open, box-like, rectangular frame 34 including a pair of left and right hand bulkheads 36, 38 which are spanned by a cover plate 40 located forward of and angling downwardly relative to the cross member 14. The lower ends of the bulk heads 36, 38 are connected by a forwardly disposed, transverse cutter bed 42 in a manner such that the header frame has closed upper, lower and side portions but has an open crop receiving mouth 44 intermediate the bulkheads 36, 38. A series of conventional disk-type cutters 45 are mounted to cutter bed 42 for cutting crop material and propelling the cut crop material rearwardly. A pair of cooperating, counter-rotating conditioner rolls 46, 48 extend across the header frame 34 to the rear of the mouth 44 for receiving cut crop material from the cutter bed 42 and crimping or conditioning the crop material before it is fed through a discharge chute 50 to the ground. A deflection baffle 52 projects forwardly of the mouth 44 above the cutter bed 42 for facilitating a smooth transfer of crop material from the cutter bed 42 to the conditioning rolls 46, 48.

With reference to FIGS. 2 and 4–6c, a mechanical drive line 54 extends substantially along and is rotatably supported by the tongue 22 for transmitting a driving force from the tractor power take-off shaft 27 to the disk cutters 45 and conditioning rolls 46, 48 of the harvester 10. The front end of the drive line 54 nearest the tractor includes a fixed position portion 58 having a forward end 60 and a rearward end 62, the fixed position portion 58 being suspended beneath the tongue 22 by a hanger or pedestal 64 having a bearing 65 which encircles the rearward end 62. The forward end 60 of the fixed position portion 58 is coupled for rotation, such as by a constant velocity or CV joint (not shown), with the power take-off shaft 27. The rearward end 62 of the fixed position portion 58 extends slightly rearwardly of the pedestal 64 and is connected to one side of a CV joint 66. The other side of the CV joint 66 is connected to the forward end 68 of a telescoping portion 70 of the drive line 54 which includes an inner drive shaft 72 having a splined, sliding connection with an outer driven shaft 74. The splined connection allows sliding movement between the outer driven shaft and the inner drive shaft 72 and further provides rotation of the outer driven shaft 74 in response to rotation of inner drive shaft 72. As seen in FIG. 6b, a lubricating bracket 76 surrounds an innermost segment 74a of the outer driven shaft 74 which is offset from an outermost segment 74b of the outer driven shaft 74. The lubricating bracket 76 allows lubricant to be introduced between the inner drive shaft 72 and the outer driven shaft 74 via a lubricating nipple 78 as is well known. The rearward end 80 of the outer driven shaft 74 is coupled to a connecting joint 82 which in turn is connected to an input shaft 84 of a conventional 90° gear box 86. The CV joint 66 and the connecting joint 82 are standard off-the-shelf components which are readily available from a number of commercial sources.

Turning back to FIG. 3, a housing 88 is mounted to the gear box 86, and gear box 86 and housing 88 are supported for rotation forwardly of tongue pivot axis 30 on a riser 90 extending upwardly from the cover plate 40. Although not shown, it is understood that the gear box 86 contains appropriate gearing to provide a right angle driving connection between the input shaft 84 and a downwardly extending vertical output shaft 92. A hub 93 is concentric with the vertical shaft 92 and projects upwardly above the gear box 86. The hub 93 is journaled in an arm structure 94 extending upwardly from the top of cover plate 40 and then forwardly along the top of gear box housing 88. The lower end of the output shaft 92 is connected by a coupling 96 to the upper end of a vertical shaft 98 leading into a horizontal gear case 100. The gear case 100 is disposed within cutter bed 42 and functions to drive the overlapping, rotating disk cutters 45 for cutting the crop introduced into the mouth 44 of the header 32. The output shaft 92 and the vertical shaft 98 have a common axis of rotation which defines a second upright pivot axis located forwardly of the first upright pivot axis.

In addition, a drive system is interconnected with gear box output shaft 92 for imparting rotation to conditioning rolls 46, 48. In one embodiment, a drive arrangement can extend upwardly from one end of gear case 100 at one of bulk heads 36 or 38, with a suitable power transfer system interconnected with the upwardly extending drive arrangement for powering conditioning rolls 46, 48. In another embodiment, gear box 86 may have a second, fixed position gear box below gear box 86, with a laterally extending output shaft extending from the stationary gear box and interconnected at one of bulk heads 36 or 38 with a drive arrangement for powering conditioning rolls 46, 48.

In accordance with the present invention, it is advantageous to pivot the gear box 86 about the output shaft 92 in response to pivoting of the pull tongue 22 in order to maintain the input shaft 84 of the gear box 86 aligned with the telescoping section 70 of drive line 54. To accomplish this, the telescoping portion 70 of drive line 54 is surrounded with a shielding arrangement 104 uniquely supported thereon so as to transmit swinging motion of the tongue 22 to the gear box 86 without creating undue torsional loading at opposite points of the telescoping portion 70 of drive line 54.

Figure 7:
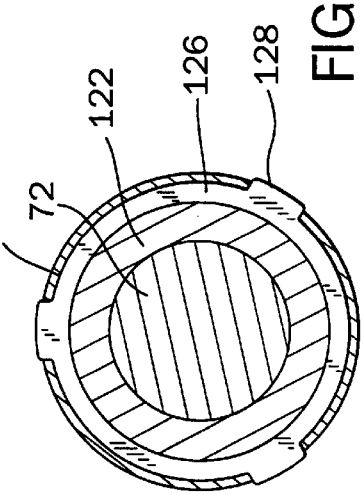

In the preferred embodiment of FIGS. 3–9, the shielding arrangement 104 comprises a tubular inner shield 106 and a tubular outer shield 108 slidably mounted upon the inner shield 106. As best seen in FIG. 6a, the forward end 110 of the inner shield 106 is provided with a ball bearing 118 which is held by retainers 120 between an inside wall of the inner shield 106 and the outside wall of a cylindrical hub 122 which is attached to the inner drive shaft 72. The CV joint 66 includes a sleeve-like jacket 124 which extends between the CV joint 66 and the inner shield 106. At the rear of the jacket 124, a first cylindrical nylon bearing 126 is retained between the inside wall of the jacket 124 and the outside wall of hub 122. As shown in FIG. 7, the nylon bearing 126 has three circumferentially spaced ears 128 which project into the jacket wall to be retained in place. At the front of the jacket 124, a second cylindrical nylon bearing 130 is held by retainers 132 between the inside wall of the jacket 124 and a groove 135 formed on an enlarged rotating portion of the CV joint 66. The bearings 118, 126 and 130 are so positioned to allow rotation of the CV joint 66, the inner drive shaft 72 and the hub 122 relative to the jacket 124 and the inner shield 106.

Referring to FIG. 6c, the rearward end 116 of the outer shield 108 is pivotally attached thereto by a pair of pivot stubs 136, 138 which are held in place by spacing retainers 140. With this structure, the outer shield 108 will not rotate. Instead, the outer shield 108 and inner shield 106 are able to pivot upwardly and downwardly about a horizontal pivot axis defined by the stubs 136, 138.

FIGS. 8 and 9 illustrate the relationship of the inner drive shaft 72, the innermost driven shaft 74a, the outermost driven shaft 74b, the inner shield 106 and the outer shield 108. Outer shield 108 is not rotatable, while the drive shaft and the driven shaft components are rotatable within the shielding arrangement 104.

In operation, when the tongue 22 is swung to the center position shown in FIG. 4, the telescopic portion 70 of the drive line 54 as well as the telescoping shielding arrangement 104 moved toward a retracted position. However, when the tongue 22 is swung away from center to either the left or right of the tractor, the telescoping portion 70 of the drive line 54 and the telescopic shielding arrangement 104 move away from the retracted position and toward an extended position shown in FIG. 5. The shielding arrangement 104 functions as a steering device for pivoting the gear box 86 and its input shaft 84, through housing 88, in the general direction of the pull tongue 22. As a result of the shielding arrangement 104 and its connections to the gear box 86 and the CV joint 66, undesirable torsional loading occurring at opposite ends of the telescoping portion 70 of the drive line 54 is minimized. The provision of the horizontal pivotal connection of the shielding arrangement 104 to the gear box 86 enables the vertical floating movement of head 32 of harvester 10 as head 32 follows the ground contour. In addition, shielding arrangement 104 provides the safety function of preventing persons from being exposed to the rotating drive lines. It should also be understood that the fixed position portion 58 of the drive line 54 may be provided with a shield for protective purposes although such a shield does not form a part of the invention.

Thus, the invention essentially contemplates a dual use for a drive line shield, namely that of steering a pivotable gear box while simultaneously preventing contact with the rotating components of the drive line.

Figure 10:
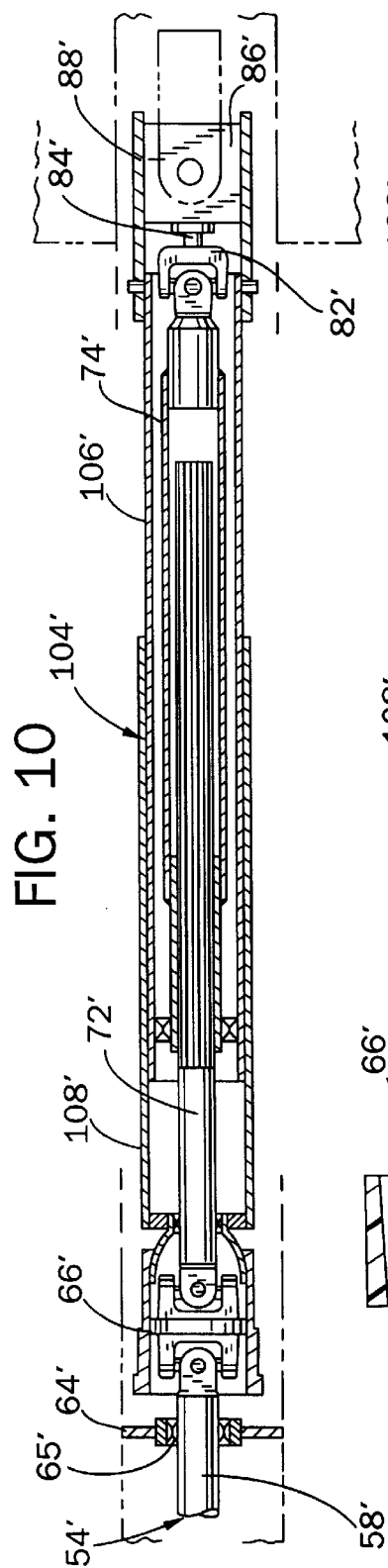
FIGS. 10 and 11 are views similar to FIGS. 4 and 6a, respectively, showing a second embodiment of the shielded drive line and gear box steering arrangement of the invention.
Figure 11:
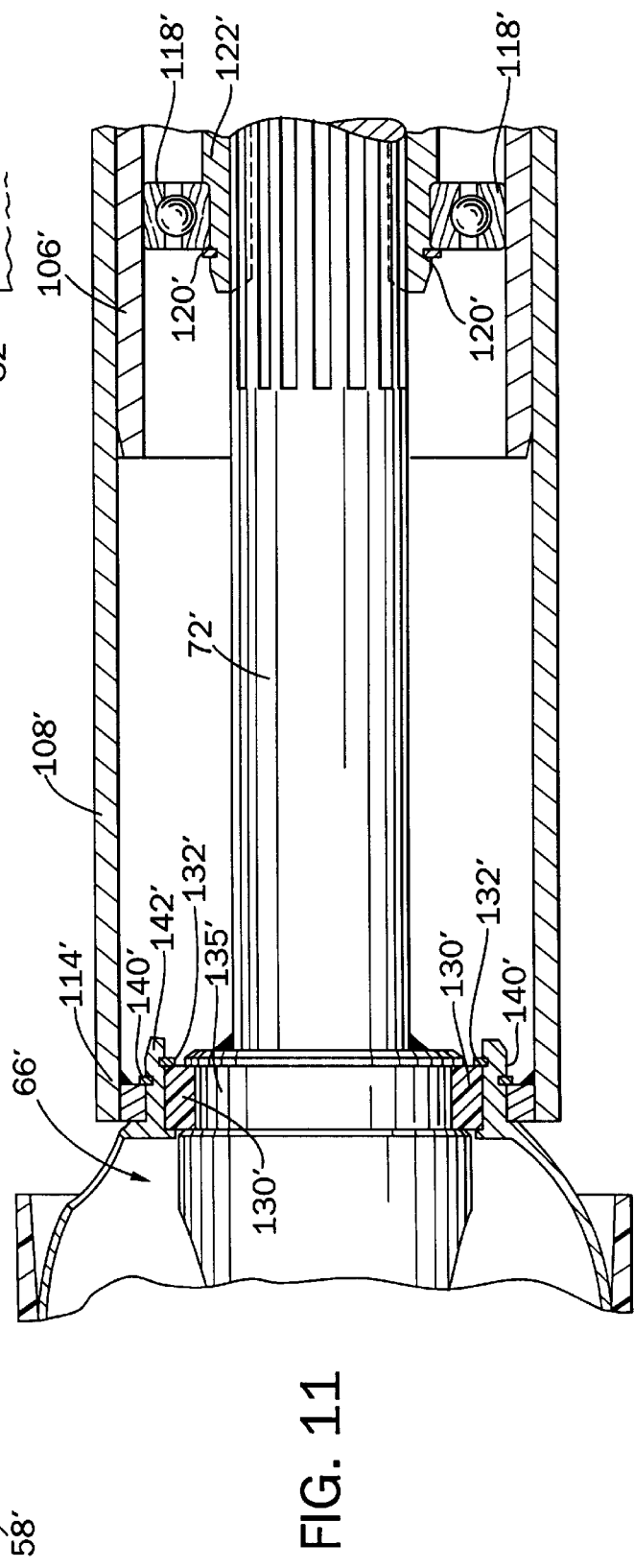

FIGS. 10 and 11 illustrate a second embodiment of the invention which differs from the preferred embodiment of FIGS. 3–9 in the disposition of the inner shield 106' and the outer shield 108' and the support of these components on the telescoping portion 70' of the drive line 54'. More particularly, inner shield 106' is slidably mounted within outer shield 108' and the forward end 114' of the outer shield 108' is held by retainers 140' in surrounding relationship with an outer portion of a crown 142 extending rearwardly from the CV joint 66'. A nylon bearing element 130' is held by a retainer 132' between an inner portion of the crown 142 and a groove 135' formed in the enlarged rotating portion of the CV joint 66'. Also in this embodiment, the hub 122' is joined to the inner drive shaft 72' and the ball bearing 118' is held by retainers 120' between the inside wall of the inner shield 106' and the hub 122' to allow rotation of the inner drive shaft 72' and hub 122' relative to the non-rotatable inner and outer shields 106', 108', respectively. The embodiment of FIGS. 10 and 11 is essentially reverse from that illustrated in FIGS. 1–9, in that the inner shield 106' is the rearward shielding member which is pivotably connected about a horizontal axis to housing 88', and the outer shield 108' is the forward shielding member and interconnected with CV joint 66'.

Figure 12:
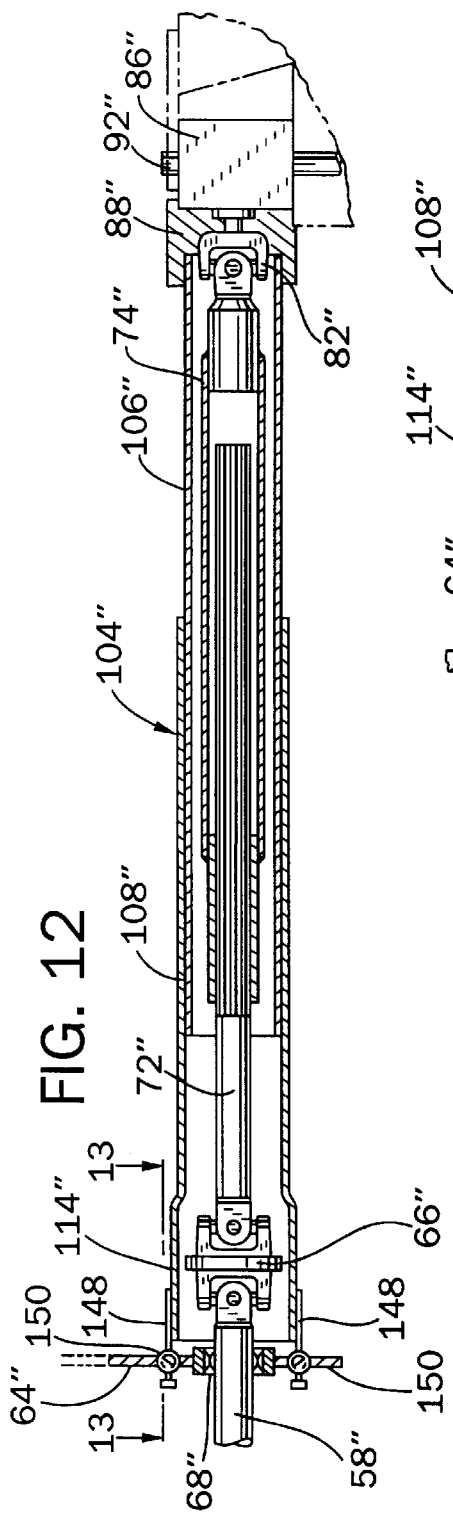
FIG. 12 is a side sectional view of a third embodiment of the shielded drive line and gear box steering arrangement of the invention.
Figure 13:
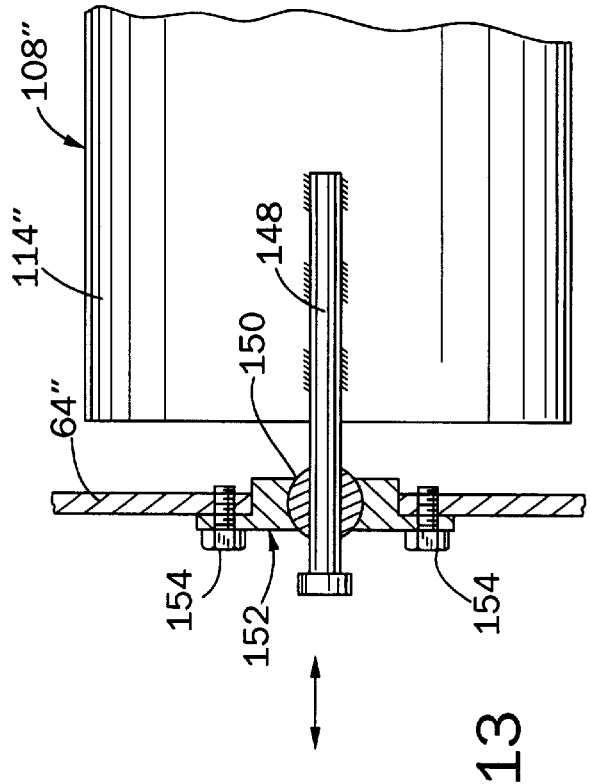
FIG. 13 is a partial sectional view taken on line 13—13 of FIG. 12.

FIGS. 12 and 13 illustrate a third embodiment of the invention wherein the inner shield 106" is slidably mounted to the outer shield 108" and the forward end 114" of the outer shield 108" is enlarged to extend around the CV joint 66". A pair of headed rods 148 are welded axially along the top and bottom of the outer shield 108". Each of the rods 148 is slidably received in a spherical bearing 150 forming part of an insert 152 attached to the tongue pedestal 64" by fasteners 154. This construction prevents rotation of the inner shields 106" and the outer shield 108', and allows for limited fore and aft movement of the outer shield 108" relative to the inner shield 106".

Figure 14:
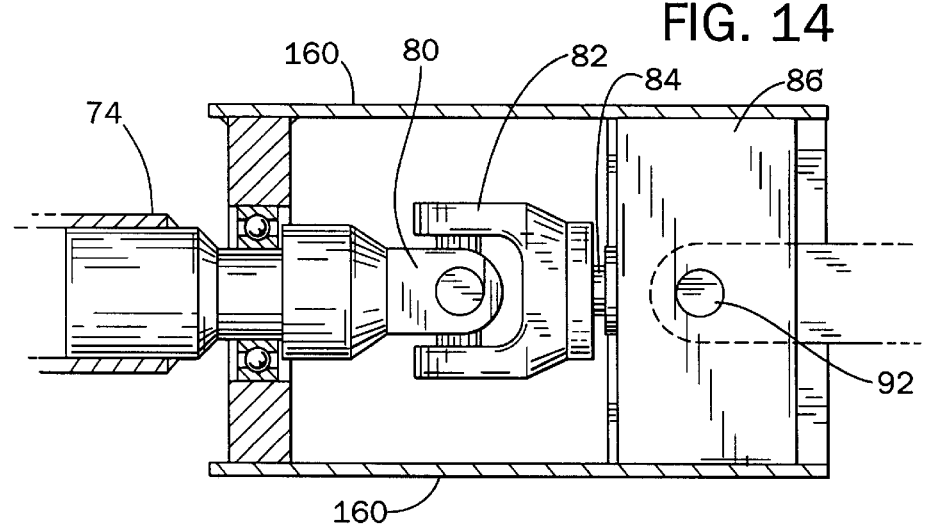
FIG. 14 is a partial section view somewhat similar to the rear end portion of FIG. 4, illustrating an alternative embodiment of a gear box steering arrangement constructed in accordance with the present invention.
Figure 15:
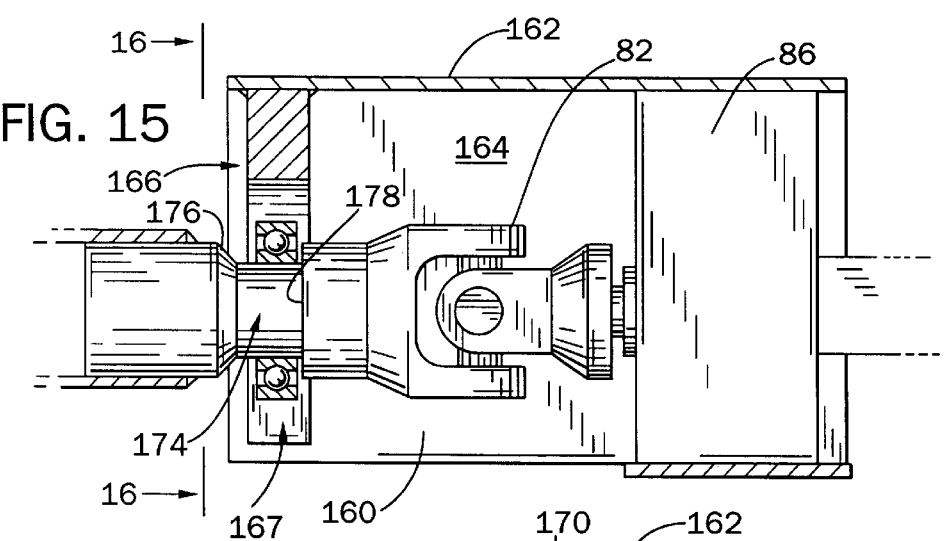
FIG. 15 is a side elevation view, partially in section, showing the gear box steering arrangement of FIG. 14.
Figure 16:
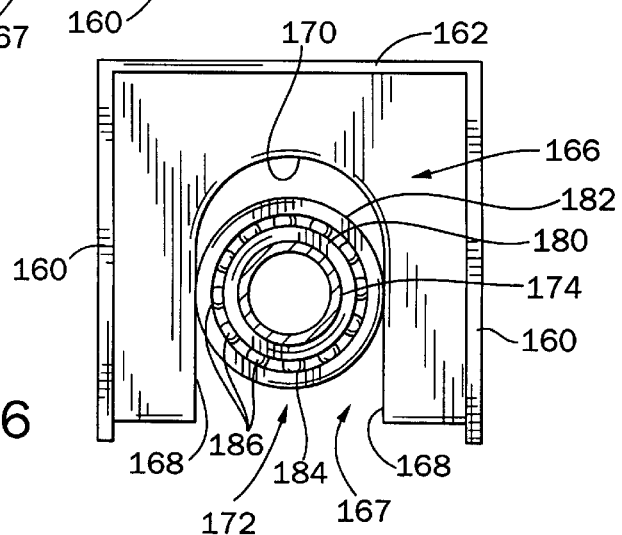
FIG. 16 is a section view taken along line 16—16 of FIG. 15.

FIGS. 14–16 illustrate yet another embodiment of the invention. In this embodiment, drive line 54 has substantially the same construction as described previously, terminating in a rearward end 80 of outer driven shaft 74 coupled to a connecting joint 82 for providing power to input shaft 84 of gear box 86. A conventional drive line shield is provided for drive line 54.

In this embodiment, a housing is mounted to gear box 86, and includes a pair of side walls 160 and an upper wall 162. Walls 160 are mounted to the sides of gear box 86, and wall 162 is mounted to the top of gear box 86. Walls 160 and 162 define an internal cavity 164 within which outer driven shaft rearward end 80 is located, as is connecting joint 82. A front plate member 166 is mounted to the forward end of each of side plates 160 and top plate 162, and defines the forward extent of cavity 164.

Referring to FIG. 16, front plate member 166 is provided with an inverted U-shaped channel 167 defining a pair of side edges 168 and an end edge 170 extending therebetween, which opens onto the lower edge of front plate member 166. A bearing assembly, shown generally at 172, is received within channel 167 between side edges 168.

Referring to FIG. 15, outer driven shaft 74 includes a reduced-diameter neck area 174 with which bearing assembly 172 is engaged. Neck area 174 is in overlapping axial alignment with channel side edges 168, so as to maintain bearing assembly 172 in engagement with channel side edges 168. Outer driven shaft 74 defines a tapered area 176 forwardly of neck area 174, and a shoulder 178 forms the rearward extent of neck area 174 forwardly of rearward end 80. Tapered area 176 and shoulder 178 function to limit axial movement of bearing assembly 172 relative to outer driven shaft 74.

Bearing assembly 172 includes an inner circular collar 180 and an outer circular flange 180, which cooperate to define a race 184 therebetween. A series of ball-type bearing members 186 are received within race 184. In accordance with conventional bearing construction, ball-type bearing members 186 accommodate relative rotation between inner collar 180 and outer member 182, such that collar 180 is rotatable along with outer drive shaft 74 while outer member 182 is non-rotatable relative to front plate member 166.

Bearing assembly 172 may be any satisfactory deep groove ball-type bearing available from Torrington of Torrington, Conn.

Bearing assembly 174 is adapted for upward and downward movement within channel 167, to accommodate changes in the vertical angular orientation of drive line 54 relative to header 32. In addition, engagement of bearing assembly 172 with front plate member 166, through engagement of bearing outer member 182 with channel side edges 168, provides steering of gear box 86 in response to changes in the horizontal angle between drive line 54 and header 32. That is, as tongue 52 is moved laterally to steer harvester 10, drive line 54 is also moved laterally relative to header 32 and engagement of bearing assembly 172 with front plate member 166 functions to pivot gear box 86 about its pivot axis, in the same manner as described previously.

The embodiment of FIGS. 14–16 eliminates modification of the drive line shield to provide gear box steering, and also eliminates the need for a separate steering arm between the tongue and the gear box. This embodiment thus provides a simple and efficient means for gear box steering without requiring extensive modifications to the existing structure of the harvester.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

I claim:

1. A pull-type harvester adapted for laterally offset attachment to a towing tractor having a power take-off shaft, comprising:
    a frame;
    a harvesting header supported by the frame, including a cutting apparatus for cutting crops as the harvester is towed by the tractor and a gearbox pivotally mounted for movement about a first pivot axis; wherein the gearbox includes an output drivingly interconnected with the cutting apparatus;
    a pull tongue pivotally coupled to the frame for lateral pivoting movement about a second pivot axis spaced from the first pivot axis for varying the position of the harvester relative to the tractor;
    a mechanical drive line extending along and rotatably supported by the pull tongue for supplying driving power to the gearbox, wherein the driveline includes a variable length arrangement;
    a gearbox housing interconnected with the gearbox for movement about the first pivot axis; and
    a steering arrangement associated with the drive line and interconnected with the gearbox housing independent of connection to the pull tongue for steering the gearbox by causing pivoting movement of the gearbox housing, and thereby the gearbox, about the first pivot axis in response to movement of the drive line.

2. The pull-type harvester of claim 1, wherein the steering arrangement comprises a bearing arrangement interconnected with the drive line and with the gearbox housing for causing pivoting movement of the gearbox housing about the first pivot axis in response to movement of the drive line.

3. The pull-type harvester of claim 1, wherein the drive line is interconnected with the gearbox via a flexible joint, wherein the flexible joint is located rearwardly of the bearing arrangement.

4. The pull-type harvester of claim 1, wherein the steering arrangement comprises a variable length shielding arrangement surrounding at least a portion of the drive line and interconnected with the gear box housing for causing pivoting movement of the gearbox housing about the second pivot axis in response to movement of the drive line.

5. A pull-type harvester adapted for laterally offset attachment to a towing tractor having a power take-off shaft, comprising:
    a frame;
    a harvesting header supported by the frame, including a cutting apparatus for cutting crops as the harvester is towed by the tractor and a gearbox pivotally mounted for movement about a first pivot axis, wherein the gearbox includes an output drivingly interconnected with the cutting apparatus;
    a pull tongue pivotally coupled to the frame for lateral pivoting movement about a second pivot axis spaced from the first pivot axis for varying the position of the harvester relative to the tractor;
    a mechanical drive line extending along and rotatably supported by the pull tongue for supplying driving power to the gearbox, wherein the drive line includes a variable length arrangement;
    A gearbox housing structure pivotably mounted to the header for movement about the first pivot axis, wherein the gearbox steering structure is interconnected with the gearbox; and
    a steering arrangement associated with the drive line and interconnected with the gearbox housing structure independent of connection to the pull tongue for steering the gearbox by causing pivoting movement of the gearbox housing structure, and thereby the gearbox, about the first axis in response to movement of the drive line through engagement of the steering arrangement with the gearbox through the gearbox housing structure.

6. The pull-type harvester of claim 5, wherein the gearbox housing structure receives at least a portion of the gearbox.

7. The pull-type harvester of claim 6, wherein the gearbox housing structure is pivotally mounted to the header for movement about the first pivot axis via a support structure interconnected with the header.

8. The pull-type harvester of claim 7, wherein the support structure includes an upper plate member secured to the header and spaced above a top wall defined by the header, and wherein the gearbox housing structure is located between the header top wall and the upper plate member.

9. The pull-type harvester of claim 8, wherein the gearbox housing structure and upper end of the gearbox are pivotally mounted to the upper plate member for movement about the first pivot axis.

10. The pull-type harvester of claim 6, wherein the steering arrangement comprises a bearing member engaged with the gearbox housing structure and with the drive line, wherein horizontal movement of the drive line causes pivoting movement of the gearbox housing via engagement of the bearing arrangement with the gearbox housing structure.

11. The pull-type harvester of claim 10, wherein the gearbox housing structure defines a vertical slot within which the bearing arrangement is located, wherein the bearing arrangement is movable vertically within the slot in response to vertical movement of the drive line.

12. A pull-type harvester adapted for laterally offset attachment to a towing tractor having a power take-off shaft, comprising:

a frame;

a harvesting header supported by the frame, including a cutting apparatus for cutting crops as the harvester is towed by the tractor and a gearbox pivotally mounted for movement about a first pivot axis, wherein the gearbox includes an output drivingly interconnected with the cutting apparatus;

a pull tongue pivotally coupled to the frame for lateral pivoting movement about a second pivot axis spaced from the first pivot axis for varying the position of the harvester relative to the tractor;

a mechanical drive line extending along and rotatably supported by the pull tongue for supplying driving power to the gearbox, wherein the drive line includes a variable length arrangement;

a flexible joint interposed between the drive line and the gearbox;

a gearbox housing interconnected with the gearbox for movement about the first pivot axis; and a gearbox steering arrangement associated with the drive line separate from the flexible joint and independent of connection to the pull tongue for steering the gearbox by causing pivoting movement of the gearbox housing about the first pivot axis in response to movement of the drive line.

13. The pull-type harvester of claim 12, wherein the gearbox is at least partially enclosed by and engaged with the gearbox housing pivotally mounted to the header for movement about the first pivot axis, and wherein the gearbox steering arrangement is operable on the gearbox housing for causing pivoting movement of both the gearbox and the gearbox housing about the first pivot axis in response to movement of the drive line.

14. The pull-type harvester of claim 13, wherein the gearbox housing includes a pair of spaced walls, and wherein the gearbox steering arrangement includes a pair of engagement members extending in opposite directions relative to the drive line, wherein each engagement member is engaged with one of the spaced walls of the gearbox housing and is operable to impart pivoting movement to the gearbox housing about the first pivot axis in response to lateral movement of the drive line.

15. The pull-type harvester of claim 13, wherein the gearbox housing is pivotally mounted to the header for movement about the first pivot axis via a support structure interconnected with the header.

16. The pull-type harvester of claim 13, wherein the gearbox steering arrangement comprises a bearing connected to the drive line, and wherein the bearing is engaged with the gearbox housing, wherein lateral movement of the drive line functions to steer the gearbox housing via engagement of the bearing with the gearbox housing.

17. The pull-type harvester of claim 16, wherein the gearbox housing includes a wall through which the drive line extends, wherein the wall includes a substantially vertical slot and wherein the bearing is engaged within the slot.

18. The pull-type harvester of claim 13, wherein the steering arrangement comprises a variable length shielding arrangement surrounding at least a portion of the drive line and interconnected with the gearbox housing for causing pivoting movement of the gearbox housing about the first pivot axis.

* * * * *